INVENTOR.
MONTROSE K DREWRY
BY
Morsell & Morsell
ATTORNEYS.

United States Patent Office 3,360,929
Patented Jan. 2, 1968

3,360,929
GAS TURBINE COMBUSTORS
Montrose K. Drewry, 3019 South Shore Drive,
Milwaukee, Wis. 53207
Filed Mar. 10, 1966, Ser. No. 533,214
10 Claims. (Cl. 60—39.65)

ABSTRACT OF THE DISCLOSURE

A gas turbine combustor having a tube for receiving a flow of compressed air, a conical casing within the tube having an apex with an opening of a size to accommodate a nozzle of a type to discharge a hollow conical spray within the conical casing, a guiding cone supported concentrically within the conical casing to form a mixing space therebetween for receiving the hollow spray, there being air apertures spaced around the conical casing which cause air to be jetted at high velocity into the mixing space to provide for violent and effective intermixing of the air and oil at an early stage before said mixture passes beyond the guiding cone.

---

This invention relates to improvements in gas turbine combustors, and more particularly to combustors that result in improved performance, especially as power outputs are increased by the present trend toward higher gas temperatures.

It is a general object of the present invention to provide an improved combustor which causes the air and oil streams to meet early and mix intimately and thoroughly, and then to flow with high turbulence, closely together, for early and complete combustion.

A further object of the invention is to provide a device wherein, at the zone of highest flame temperature, the combustor casing is cooled effectively by high velocity air before it enters the combustor near the oil nozzle.

As applied to gas turbine combustors, the features of the present invention have the following purposes:

*Purpose 1.*—To minimize carbon.
*Purpose 2.*—To maximize gas temperature and thus power output.
*Purpose 3.*—To reduce the size and weight of the combustor.

Referring to Purpose 1, carbon represents incomplete combustion, and more specifically the "cracking" of oil vapor in part to elemental carbon in the absence of air. To achieve as near perfect combustion as is practical requires:

*Item 1.*—That the air and oil streams be thoroughly and intimately mixed into one homogeneous stream as soon as possible after discharge of the oil from the nozzle.
*Item 2.*—That the air and oil streams be mixed at moderately low combustor temperatures.
*Item 3.*—That there be no subsequent separation of the oil and air before molecular union takes place.
*Item 4.*—That total vaporization occurs as early as possible.
*Item 5.*—That adequate relative motion of air and oil vapor occurs in the combustion zone for complete molecular union.

Item 1 above is an obvious requirement when it is realized that in a modern gas turbine combustor complete combustion must occur in about $\frac{1}{2000}$ second. No time can be lost by delaying mixing. A further advantage of early mixing occurs because of the approximately threefold increase of gaseous volumes when heated to combustor flame temperatures, which further isolates these two components unless they are mixed close to the oil nozzle.

Referring to Item 2 above, if the mixing of oil and air does not take place in a region of relatively low temperature, then the oil vapor, in the absence of air, will "crack," at the high temperature, causing the formation of elemental carbon, and this carbon is then not readily mixed with air and burned, being immensely larger than oil vapor molecules. Furthermore, in addition to the direct thermal loss of carbon, that of unburned hydrocarbons which usually accompanying the formation of carbon likewise causes appreciable heat loss. Clogging of the combustor and erosion of the turbine blades are the more serious results of carbon.

Referring to Item 3, oil in the combustor is in the neighborhood of one hundred times as heavy as air and is usually impelled into the combustor at scores of times the force which impels the air. Air is capable of altering the path of only the extremely fine oil droplets that comprise but a minor part of the oil weight. Air is powerless to change the course of the larger drops which are discharged from all nozzles. Thus it is desirable to have the air so directed that it will accurately follow the path of the oil, in proper molecular proportions. Since different size oil drops take different paths from the nozzle, the required different quantity of air should accompany each drop. To obtain such proportioning in the conventional combustor, however, is practically impossible. Attempts to remix the isolated aggregations of oil and air in the usual combustor can produce only mediocre benefits.

Referring to Item 4, although liquid oil drops may appear to burn directly from the liquid phase, heating and evaporation of their surfaces is nevertheless a prerequisite. Any design that facilitates early evaporation is thus favorable to better combustion.

With reference to Item 5, because the molecules are so many and so minute, their chemical union requires effective relative motion at very close quarters of the air and oil vapor to bring about complete union. Diffusion is not enough. It must be supplemented by violent turbulence to complete the molecular union in the extremely small fraction ($\frac{1}{2000}$) of a second available in modern conventional combustors.

In the accompanying drawing, illustrating several embodiments of the invention, in which the same reference numerals designate the same parts in all of the views.

Figure 1:
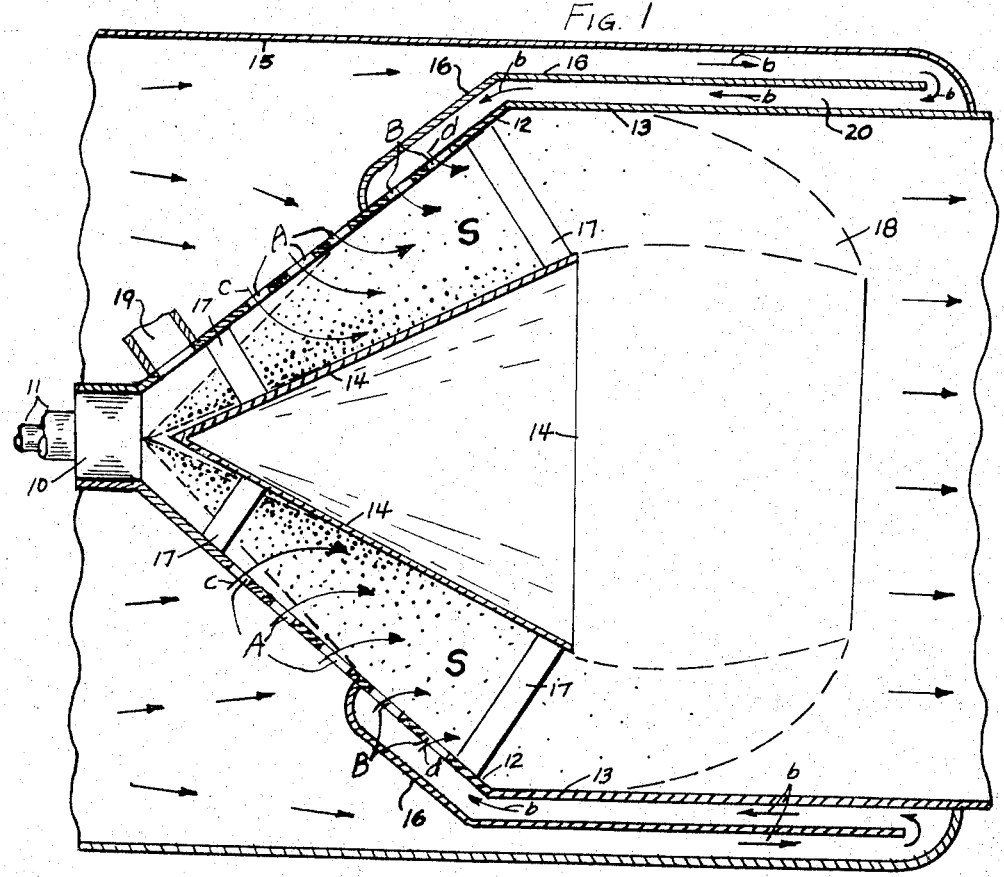
FIG. 1 is a fragmentary longitudinal sectional view through the proposed gas turbine combustor.

Referring more particularly to the drawing, the numeral 10 represents a conventional oil nozzle of the hollow cone type to give an oil spray of the hollow conical form such as spray S shown in the drawing. Satisfactory nozzles of the hollow cone types and having wide output range are manufactured by Lucas Gas Turbine Equipment, Ltd., Shaftmoor Lane, Birmingham 28, England, and probably others. The spray angle illustrated is 90 degrees (included angle), although lesser or greater angles may be used to suit particular designs. The use of some of the so-called "semi-hollow cone" nozzles is not satisfactory with the present invention, for some "semi-hollow cone" nozzles have too many large drops and too nearly a solid cone spray. The nozzle is supplied by oil under pressure through the pipe or pipes 11.

Oil nozzle 10 is supported and restrained with its axis coincident with the combustor axis by a conically shaped casing 12 encompassing the oil spray S and located accurately around the longitudinal axis of nozzle 10. This conical casing 12 merges with a cylindrical inner casing 13, the two casing portions 12 and 13 forming the inner containing portion of the combustor.

An important feature of novelty in the combination of the present invention resides in the use of a special guiding cone 14 suitably supported, as by one or more brackets 17, from the conical casing 12. This cone 14 and its supporting brackets 17 are cooled importantly by evaporation of oil that contacts it, and the cone has an included angle usually less than the angle of the conical casing portion 12. The spray angles, interior and exterior, should be such that most favorable overall results are derived. Excessive wetting of the cone causes drippage from its base that results in carbon. The cone must be accurately co-axial with the nozzle 10. Its apex-to-nozzle distance is not critical, although this distance affects cone wetting. Like the cone, its supports are cooled by oil evaporation. Being thin, they offer little obstruction to oil and air flow. They are stressed lightly. Oil burner experience proves that the cone and supports do not collect accumulations. Oil used in combustors is similar, having essentially zero ash. Slagging of the trace of ash does not occur, even with the very low excess air and thus high temperatures of oil burners.

An outer cylindrical casing 15 of the combustor, together with an intermediate partly cylindrical casing 16 are arranged to cause part of the incoming compressed air to be directed in a counterflow in the annular space 20, as indicated by the arrows (b), over the inner casing to cool it to a suitable temperature, and likewise to reduce heat loss to the exterior.

Air from the compressor which conventionally serves a gas turbine enters the combustor at the left as indicated by the arrows, part of it flowing through the above described cooling jacket 20, and thence all of the air flows through suitably designed and located air ports at A and B in the conical casing 12 where these jets mix at high velocity and turbulence with the oil spray S because they must turn at about right angles to flow with the oil stream along the guiding cone. Eddy currents resulting from the sharp turn of the air stream cause violent intermixing and complete molecular union of the air and oil as these two ingredients flow outwardly in the conical pattern into the combustion space of the combustor, where combustion is completed in an unusually short flame because of the almost perfect mixing of the air and oil, their coincidental travel, and the high excess air used in gas turbines. Approximately 100% more air than theoretically required for complete combustion is ordinarily used in order to limit the gas temperature and the resulting combustor metal and turbine blade temperatures. No carbon should occur with this combustion plan until excess air approaches 5%, regardless of partial loading of the combustor or of practical water injection. Air jets nearest the oil nozzle are propelled almost entirely across the oil spray passage to near the cone, as shown by arrows (c), before turning fully to the right because no air flow occurs from the left. Air jets (d) farthest from the oil nozzle are turned to the right almost immediately upon emerging into the oil spray passage by the high velocity that totally fills the passage at their location. Jets of intermediate locations combine with the oil spray intermediate the oil-air passageway, with the overall result that reasonably uniform oil-air ratios occur throughout. Stable combustion throughout a wide output range is an incidental result. Combustion is thus completed shortly past the base of the cone, partly because of the high excess air used in gas turbine combustors to limit gas temperatures. Cooling of the inner casing 13 is not needed past the end of the flame 18. An ignition pipe connection is represented by 19. Minor air quantities, eddied and diffused from the air jets (c), sustain ignition in the space between these nearest jets (c) and the nozzle, thus providing for the usual so-called "Primary Zone" of conventional combustors.

Because reasonably uniform air-oil ratios occur throughout the major mixing zone, as indicated by locations of air jets (c) and (d), relatively uniform gas temperatures result. There is no dearth of air in one locality, which would cause 4000° F. to be approached, nor an unnecessarily large excess of air elsewhere which would cause, say, 1000° F. to result. This is because of the final, uniform proportioning of almost all air to all oil in the relatively small mixing zone. The amount of combustion after the flame emerges past the cone 14 is limited, causing minimum heating of the inner casing 13.

Size, shape, location and spacing of the many relatively small air ports, which extend around the conical casing 12, are amenable to design calculations for best overall results. Oil spray drop sizes and numbers are measurable. The drawing proportions have been determined for oil and air quantities of a conventional combustor of equivalent outside diameter. The gas velocity leaving the cone is high, but not too high to require impractically high air pressure drop through the combustor. As shown, the base of the cone is 36% of the cross-sectional area of the inner casing 13, thus leaving 64% minimum free flow area.

Figure 2:
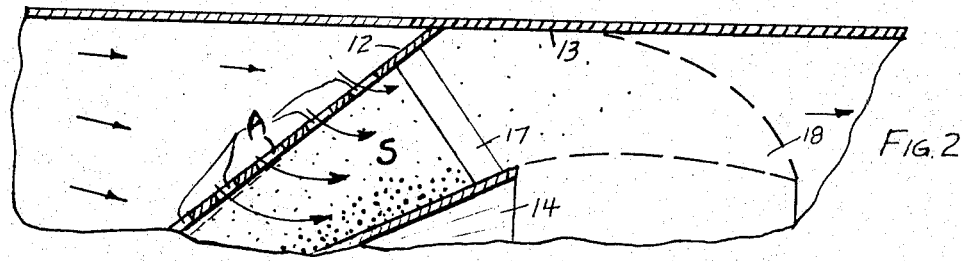
FIG. 2 is a fragmentary longitudinal sectional view showing a modification where the cooling jacket of FIG. 1 is omitted.

In some particular combustors as shown in FIG. 2 air jacket cooling of the inner casing 13 may not be needed. This is due in part to the favorable mixing and early union of total air and total oil. In such cases the outer casing is an extension to the left of the inner casing 13 of FIG. 1, and all the air flows directly into the conical casing air ports as shown in FIG. 2. This would reduce the combustor diameter.

Figure 3:
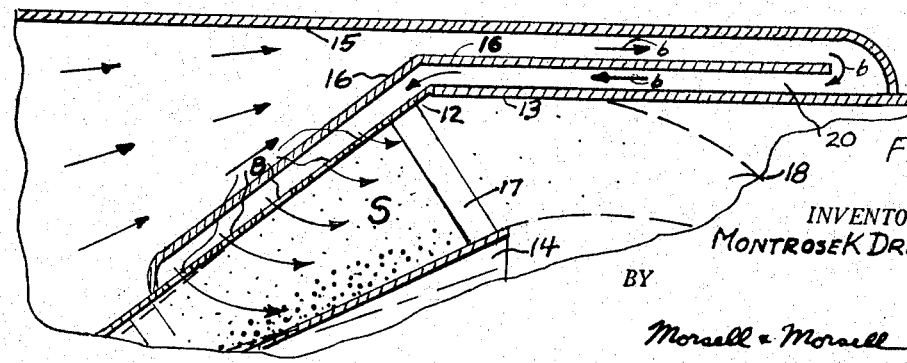
FIG. 3 is a fragmentary longitudinal sectional view showing another modification in which all of the air from the compressor is routed through the cooling jacket before being jetted through the conical casing.

In other special cases, all of the air might be routed through the cooling jacket, thus eliminating the air ports (A) of FIG. 1 and increasing the number of holes B correspondingly as illustrated in FIG. 3.

With the present invention, all of the requirements of Purpose 1, Item 1 of the introduction of this specification are met because an early, intimate and thorough mixing of the oil and air occurs. Initial union of the air and oil streams occurs within a couple of inches of the oil nozzle, and this is about the closest distance that is practical. The sharp angle turning of the high velocity air streams results in high initial and continuing turbulence. Intimacy of mixture results from the small space occupied by all of the air and oil during this period of high tubulence. Thus the important rules for effective mixing are met. If unmixed oil and air should escape past the cone, they are still traveling at substantially the same direction and are, therefore, never far apart from each other, nor out of reach of the eddy currents that are capable of continuing the mixing action throughout the combustion zone. Unlike many conventional designs, there is no problem of mixing remote accumulations of air and oil. With the present invention the final mixing is close to ideal.

The construction of the present invention also meets all of the requirements of Purpose 1, Item 2 of the introduction, because it prevents formation of any substantial amount of carbon or unburned products. This is partly due to the early mixing referred to above and to the relatively low temperatures in the zone of the cone. Little cracking to carbon occurs because of the absorption of heat by the cone and its shielding of the oil spray from too early contact with the highest heating.

The design of the present invention also meets the requirements of Purpose 1, Item 3 of the introduction because the cone 14 causes the air and oil to travel in the same path. No need exists for larger oil drops to be redirected by the air stream as in conventional designs.

The requirements of Purpose 1, Item 4 of the introduction are also fulfilled because the cone assists the evaporation of the oil very close to its source. With all of the oil traveling at over 40 miles per hour, less than about $\frac{1}{300}$ second is available in conventional combustors for evaporation while the oil spray is free-flowing a distance about equal to the length of the cone 14, and much less than that time is available while in the combustor. With the present invention, however, upon part of the oil contacting the cone there is a high resistance to flow of the oil along the cone which greatly increases the time available for evaporation. Early evaporation, therefore, is assisted substantially by the presence of the guiding cone 14. The drawing represents the larger oil drops in the oil spray S by heavier dots nearest the cone and thus at the inner periphery of the spray. This phenomena is illustrated in Monarch Mfg. Works, Inc.'s oil burner accessories catalog for its PLP and PL F–80 nozzles. Impingement on the cone of these larger, and thus slower to burn drops, assists combustion considerably, besides limiting the cone temperature. The design provides for more combustion time for larger drops.

The requirements of Purpose 1, Item 4 of the introduction are met with the present design because of the intense turbulence caused by the high velocity and sharp-angled turning of the air as it joins the oil stream after passing through air ports at A and B. This turbulence is also augmented by the wide difference in velocity of the air and oil as they progress along the cone. Mixing and molecular union are assisted importantly because local eddy currents cause the air to cross the combined air-oil stream. The oil drops move slower than the air, but always in the same general direction.

The requirements of Purpose 2 of the introduction are also fulfilled. Metal temperatures in the combustor are minimized principally by the functioning of the guiding cone 14 and the high air velocity of the total air jetting into the oil stream, and secondarily by the cooling jacket. Lower metal temperatures permit higher combustor outlet gas temperature and thus more power output by the gas turbine.

To assist understanding of why early mixing of total air with all the oil results in lowest metal temperatures, let's assume that instead of one-stage mixing a two-stage mixing plan is employed in which half of the air is admitted in each stage. In the first stage, because half of the total air represents the theoretical amount for total combustion when assuming 100% excess air, the resulting flame temperature in the absence of heat losses would be approximately 4000° F., an obviously destructive temperature. Adding the 100% excess air in the second stage would reduce the temperature to approximately 2000° F., at which some combustors can be serviceable.

Present conventional combustors admit air progressively along the total path of oil travel, using the air to cool the liner before it mixes with the oil to generate heat. Thus the very air used for cooling may also cause overheating. Proportioning air and oil is difficult in the conventional combustor because no exact knowledge can exist of air and oil quantities at all locations in the combustor. In some areas, conditions like the above-cited two-stage combustion may exist, and in others a wide range of air-oil ratios exist, ranging from a dearth of air, causing carbon, to an inordinately high excess of air. Where less than 100% excess air occurs, the liner is likely to be overheated. Trial and error is necessary to obtain a practical design in which the metal is not overheated or overstressed. The combustor metal must not fail, for failed metal entering the gas turbine destroys its blading.

Mixing all of the air thoroughly with all of the oil at the entrance to the combustion space removes all questions of improper oil-air ratios causing "hot-spots" and thus overheating of the combustor, providing subsequent union of the molecules is soon enough to avoid high rates of combustion near the casing. The high turbulence and high excess air used in the proposed combustor, with the unburned oil traveling exactly in the same highly turbulent path as the total air, assure early completion of combustion and quick response to wide power changes. Experience shows that a very short stable flame will occur under these conditions.

The value of limiting metal temperatures of combustors is high. It permits higher outlet gas temperatures for the same metal temperature and thus it gains vital power output increases. 100° F. higher gas temperature causes approximately 10% more power output, which is obviously at a substantial, high rate. Improved metals and air cooling of turbine blades are requiring combustors of the increasingly higher outlet gas temperatures that the proposed new type can afford.

The present invention also carries out the requirements of Purpose 3 of the introduction. Compactness and weight of combustors are obviously of importance in aviation gas turbines ("jet engines"). If their size and weight can be reduced without increasing their air pressure drop worthwhile gains are netted.

Air pressure drop takes power from the gas turbine to turn the compressor. All air pressure drop used in the combustor should be expended with top effectiveness. The very early mixing of air and oil in a minute space, and then their coincidental flow in the relatively small cone-shaped pattern wherein air turbulence causes final union of the last uncombined air and oil molecules, utilizes air pressure loss at high effectiveness. In fact, the aspirating effect of the conical oil spray acts as a tangible means of limiting the air pressure drop in the present combustor because it creates slightly reduced pressure at the point of mixture.

In conventional combustors, air jets emitted through the liners cannot mix effectively with the oil, nor can they nor the oil spray act as ejectors to minimize their required pressure drop. The relatively large combustion space cannot be readily penetrated by the air jets unless their velocity, and thus their pressure drop, is relatively high. Air and oil volumes are high in the zone of final mixing, thus causing a contrast with the ease of mixing in the present combustor. A cardinal principle of mixing requires that for minimum energy expenditure it be done in minimum space. Specific volume of the air is some three times higher at combustor temperature than when entering, and when oil is vaporized in the combustor its volume increases some hundred times. Energy requirements of mixing are limited by the present plan. Less power is required by the air compressor and thus the net gas turbine power available for vehicle propulsion or for other effective work is increased. The credit for compressor power savings is usually at a high rate.

Since pressure drop in the present combustor is less than that in conventional combustors, its size may be limited if combustion requirements are met. Again, since the several features for the proposed combustor result in completeness of combustion in much less space than in conventional combustors, its size and thus weight can be significantly reduced. Length reductions are more probable than those of diameter because of one-point air injection very close to oil entry, as contrasted with progressive air injection of conventional combustors 30% length reduction, based on oil burner test knowledge, appears probable despite the residence time in the combustor being reduced from $\frac{1}{2000}$ second to $\frac{1}{3000}$ second. Doubling of chemical reactions about each 40° F. higher combustor temperatures, but principally the extremely efficient mixing, afford this promise.

Various changes and modifications may be made without departing from the spirit of the invention and all of such changes are contemplated as may come within the scope of the following claims.

What I claim is:

1. In a gas turbine combustor having a tube for receiving a flow of compressed air and having a nozzle within said tube with its axis extending longitudinally of the tube and being of a type to discharge oil in the form of a spray in hollow diverging conical form, a conical casing disposed within said tube with its wide portion downstream and having an apex with an opening of a size to accommodate the nozzle in a position to discharge its conical spray within the conical casing and longitudinally thereof, the included angle of the conical casing being about the same as the included angle of the hollow spray from the oil nozzle, a guiding cone supported concentrically within said conical casing with its apex spaced downstream from and aligned with the axis of said nozzle and providing a conical mixing space between said guiding cone and conical casing which is positioned to receive the hollow conical spray of oil, said conical casing having air apertures therearound which are so distributed in the length of said conical casing as to cause air to be jetted at high velocity through said openings in a generally transverse direction into the mixing space between the casing and guiding cone and into the diverging hollow spray of oil from the nozzle prior to said mixture passing beyond the guiding cone to violently and effectively intermix with the spray at an early stage.

2. A gas turbine combustor as defined in claim 1 in which there is a cooling jacket surrounding at least a portion of said apertured conical casing and in which there is means for conducting air from the tube to said cooling jacket before it is jetted through the apertures of the conical casing.

3. A gas turbine combustor as defined in claim 2 in which the cooling jacket surrounds only a downstream portion of said conical casing whereby some of the air from the tube is jetted directly through the apertured casing and some only after it has been used for cooling.

4. A gas turbine combustor as defined in claim 1 in which the conical casing merges with a cylindrical inner casing portion which is of less diameter than the tube to provide an annular air space between a portion of said cylindrical inner casing and tube.

5. A gas turbine combustor as defined in claim 2 in which a conical casing merges with a cylindrical inner casing portion which is of a less diameter than the tube to provide an annular space between a portion of said cylindrical inner casing and tube for accommodating said cooling jacket.

6. A gas turbine combustor as defined in claim 2 in which said cooling jacket is arranged to cause the air to travel in counterflow before being jetted through the apertures of the conical casing.

7. A gas turbine combustor as defined in claim 1 in which said guiding cone is hollow.

8. A gas turbine combustor as defined in claim 1 in which the conical casing is concentrically disposed within said tube.

9. A gas turbine combustor as defined in claim 1 in which the conical casing is closed upstream of the nozzle so that substantially all of the air for combustion enters the conical mixing space through said apertures in the conical casing which are downstream of the nozzle.

10. A gas turbine combustor as defined in claim 1 in which the included angle of the guiding cone is less than the included angle of the conical casing.

References Cited

UNITED STATES PATENTS

| | | | |
|---|---|---|---|
| 1,730,440 | 10/1929 | Smith. | |
| 2,920,449 | 1/1960 | Johnson et al. | 60—39.74 |
| 2,927,632 | 3/1960 | Fraser | 158—4 |
| 2,974,485 | 3/1961 | Schiefer | 60—39.65 |

JULIUS E. WEST, *Primary Examiner.*